United States Patent [19]
Sato et al.

[11] Patent Number: 6,010,745
[45] Date of Patent: Jan. 4, 2000

[54] METHOD FOR MANUFACTURING A COMBINATION READ/WRITE THIN FILM MAGNETIC HEAD

[75] Inventors: Kiyoshi Sato; Yoshiaki Shimizu, both of Niigata-ken, Japan

[73] Assignee: Alps Electric Co., Ltd., Japan

[21] Appl. No.: 09/156,953

[22] Filed: Sep. 18, 1998

Related U.S. Application Data

[62] Division of application No. 08/921,806, Sep. 2, 1997, Pat. No. 5,894,388.

[30] Foreign Application Priority Data

Sep. 10, 1996 [JP] Japan .................................. 8-239385

[51] Int. Cl.$^7$ ................................ B05D 5/12; C23C 14/00
[52] U.S. Cl. .................... 427/128; 427/132; 204/192.15; 204/192.2
[58] Field of Search .................................. 427/127–132, 427/282, 585; 204/192.15, 192.2; 360/113, 126; 29/603

[56] References Cited

U.S. PATENT DOCUMENTS

| | | | |
|---|---|---|---|
| 3,908,194 | 9/1975 | Romankiw | 360/113 |
| 5,032,945 | 7/1991 | Argyle et al. | 360/126 |
| 5,264,980 | 11/1993 | Mowry et al. | 360/113 |
| 5,331,728 | 7/1994 | Argyle et al. | 29/603 |
| 5,388,019 | 2/1995 | Argyle et al. | 360/126 |
| 5,435,053 | 7/1995 | Krounbi et al. | 29/603 |
| 5,493,464 | 2/1996 | Koshikawa | 360/113 |
| 5,530,609 | 6/1996 | Koga et al. | 360/131 |

*Primary Examiner*—Brian K. Talbot
*Attorney, Agent, or Firm*—Brinks Hofer Gilson & Lione

[57] ABSTRACT

The lower core layer 7 is formed in approximately constant thickness at the portion confronting the upper core layer so that its thickness gradually reduces toward its side edge. Therefore, the thickness of the layer of the non-magnetic material 8 formed on the lower core layer 7 becomes uniform, stabilizing the coil layer formed thereon. An excellent material of soft magnetic materials can be used since the lower core layer 7 is formed by sputtering, enabling to record at a high frequency.

2 Claims, 4 Drawing Sheets

METHOD FOR MANUFACTURING A COMBINATION READ/WRITE THIN FILM MAGNETIC HEAD

This application is a divisional of U.S. Ser. No. 08/921,806, filed Sep. 2, 1997, now U.S. Pat. No. 5,894,388.

BACKGROUND OF THE INVENTION

1. Field of the Invention

This invention relates to an inductive type thin film magnetic head for recording with a combination read/write thin film magnetic head that is used for a floating type magnetic head, especially to a combination read/write thin film magnetic head in which a lower core layer serving also as an upper shielding for a readout magnetoresistive element and a coil layer formed on the lower core layer via an insulating layer can be constantly formed, and which allows an improvement in selectivity of soft magnetic materials by forming the lower core layer by a sputtering method, and a method for manufacturing the same.

2. Description of the Related Art

FIG. 5 is an enlarged sectional view of a conventional combination read/write thin film magnetic head viewed along the opposite direction of the recording medium.

The layer of the magnetoresistive element 1 is composed of three layers, laminating a soft magnetic layer (a soft adjacent layer; SAL), non-magnetic layer (a SHUNT layer) and a magnetoresistive layer (a MR layer) from the lower to the upper, respectively. Usually, the magnetoresistive layer (MR layer) is a layer of Fe-Ni alloy (permalloy) and the non-magnetic layer (SHUNT layer) is a layer of tantalum (Ta), and the soft magnetic layer is formed with a Ni-Fe-Nb alloy.

A lower gap layer 3 comprising a non-magnetic material like aluminum oxide ($Al_2O_3$) is formed on the lower shielding layer 2 composed of sendust or permalloy as shown on the figure, on which a layer of the magnetoresistive layer 1 is formed. Hard bias layers 4 are formed as longitudinal bias layers at both sides of the magnetoresistive layer 1. A main lead layer 5 comprising non-magnetic electrically conductive materials like copper (Cu) or tungsten (W) is formed on the hard bias layer 4 described above. An upper gap layer 6 of a non-magnetic material like aluminum oxide ($Al_2O_3$) is further formed on the main lead layer, forming a buffer layer (not shown) on the upper gap layer 6 described above. The buffer layer described above can be formed by sputtering magnetic materials like Fe-Ni alloy (permalloy). A lower core layer 13 is formed on the lower layer described above by plating, for example, permalloy.

A non-magnetic layer 14 comprising aluminum oxide is formed on the lower core layer 13, on which a coil layer 9 formed in a flat spiral pattern is provided via an organic insulating layer. An upper core layer 10 is formed on a layer of non-magnetic material 14 at a position confronting the lower core layer 13. This upper core layer 10 is also formed by plating permalloy as in the lower core layer 13 described above. A protecting layer 11 comprising aluminum oxide is provided on the upper core layer 10.

The layers from the lower core layer 13 to the protective layer 11 serve for signal recording, composing an inductive head. In this inductive head, a recording current is applied to the coil layer 9 so that a recording magnetic field is imparted to the layers from the coil layer 9 to the upper core layer 10 and to the lower core layer 13. Magnetic signals can be recorded on a recording medium like a hard disk by a fringing magnetic filed between the lower core layer 13 and upper core layer 10. In the combination read/write thin film magnetic head in which a read out part with a layer of the magnetoresistive element 1 and inductive head described above are laminated, the lower core layer 13 composing an inductive head also serves as an upper shielding layer in the read out part having a layer of the magnetoresistive element 1 as shown in FIG. 5.

In the inductive head described above, it is required for a high density recording in a recording medium that the gap distance of the magnetic gap G described above should be as short as possible. Therefore, the layer of the non-magnetic material 14 is formed as thin as possible.

In the prior art as shown in FIG. 5, however, there were problems as describe below because the lower core had been formed by plating, for example, permalloy.

(A) A terrace A is formed at both edges of the lower core layer 13 because the lower core layer 13 is thick and the cross sectional configuration of the lower core layer 13 assumes a rectangle. Therefore, making the thickness of the non-magnetic material 14 formed on the lower core layer 13 uniform is so difficult that the thickness of the non-magnetic material 14 becomes extremely thin in the vicinity of the side edges of the lower core layer 13, sometimes causing a failure of electric insulation between the lower core layer 13 and coil layer 9. Especially, when the clearance between the lower core layer 13 and upper core layer 10 is narrowed for making the gap width small in order to increase the recording density, pin holes are liable to appear on the non-magnetic material 14 at the terrace A described above because the thickness of the non-magnetic material 14 becomes too thin.

(B) A terrace is also formed on the surface of the non-magnetic material 14 above the terrace A because the cross sectional configuration of the lower core layer 13 is a rectangle forming a terrace A at both side edges. Therefore, the coil layer 9 is formed on the terrace of the non-magnetic material 14 when the area of the lower core layer 13 is smaller than the area where the coil layer 9 is formed, thereby making it difficult to form the coil layer 9 and resulting in a frequent appearance of defects in the coil layer 9.

(C) For the purpose of increasing the signal recording density and magnetic recording frequency in recording media, it is required to improve the soft magnetic characteristic of the lower core layer 13 and upper core layer 10 as well as to make them to have such properties as low coercive force and high resistivity at high saturated magnetic flux density. Permalloy that has been the conventional material for forming the lower core layer 13 and upper core layer 10 is not always a satisfactory magnetic material because, although its saturated magnetic flux density is high, its coercive force is relatively high and resistivity is relatively low so that, when the recording frequency is made higher, it results in an increase of eddy current loss and deterioration of soft magnetic characteristic. Meanwhile, U.S. Pat. No. 5,573,863 discloses a soft magnetic material in which a microcrystalline phase of Fe with a bcc crystal structure, and an amorphous phase containing the elements selected from rare earth elements or from Ti, Zr, Hf, V, Nb, Ta and W, and O, are mixed together. This kind of soft magnetic material has a high magnetic permeability at a frequency of hundreds MHz or more as well as a high saturated magnetic flux density of 5 kg or more besides having a high resistivity at low coercive force. It is preferable in the future-coming inductive head for the purpose of high density recording that the lower core layer 13 and upper core layer 10 is formed using such materials excellent in the soft magnetic characteristic as hitherto described. However, the soft magnetic material as described in the afore mentioned U.S. Pat. No. 5,573,863 in which a microcrystalline phase of Fe and amorphous phase comprising metal elements and O are mixed together can not be formed by plating, instead a sputtering method or an evaporation method is only applicable for forming the layers. In the combination read/write thin film magnetic head having a construction as shown in FIG. 5, however, forming the lower core layer 13 by sputtering was so difficult that only a material like permalloy that is adaptable for plating can be used for the soft magnetic material of the lower core layer 13.

The above description will be elaborated hereinafter. When the lower core layer 13 is formed by a sputtering method, a layer of a soft magnetic material is directly formed on the upper gap layer 6 comprising aluminum oxide on the layer of a magnetoresistive element 1. However, it is necessary to eliminate the excess part by an ion milling (dry etching) method for forming the lower core layer 13 into a prescribed configuration as described above after forming a layer of soft magnetic material by a sputtering method. It is a problem that the underlying layer of aluminum oxide is damaged when the layer of soft magnetic material is eliminated by ion milling. Generally speaking, a tolerance of about 5% in the thickness of layers to be eliminated is inevitable when a prescribed thickness of layers are eliminated by the ion milling method. Since the thickness of the underlying upper gap layer 6 is smaller than the thickness of the lower core layer 13, the thin upper gap layer 6 is liable to be damaged due to an error of about 5% in the thickness of layers to be eliminated when the upper gap layer 6 is formed by eliminating a part of the layer of soft magnetic materials formed by sputtering. In addition, since the velocity of milling is slower in the soft magnetic material comprising the lower core layer 13 than in aluminum oxide comprising the upper gap layer 6, the latter is far more liable to be damaged when the layer of the soft magnetic material is eliminated by ion milling.

The gap width of the reading part by the layer of the magnetoresistive element 1 is determined by the thickness of the lower gap layer 3 and upper gap layer 6 in this thin film magnetic head. Therefore, the upper gap layer 6 should be thin in order to enhance the resolution against high density signals. When the upper gap layer 6 is made thin in the thin film magnetic head for enabling readout of the high density signals, the upper gap layer 6 is liable to be largely damaged due to the error in the thickness for eliminating layers by the ion milling and milling rate.

From the discussions above, it can be concluded that the materials having an excellent soft magnetic characteristic as described in U.S. Pat. No. 5,573,863 can not be used in the inductive head, wherein the upper gap layer 6 is disposed on the layer of the magnetoresistive element 1 on which the lower core layer 13 is further formed and the lower core layer 13 also serves as a shield layer of the layer of the magnetoresistive element 1 as shown in FIG. 5, since the lower core layer 13 can be formed only by a plating process, thereby narrowing the selection range for the soft magnetic materials to be used for forming the lower core layer 13.

SUMMARY OF THE INVENTION

Accordingly, the object of the present invention for solving the problems in the prior art described above is to provide a combination read/write thin film magnetic head and a method for manufacturing the same, wherein the lower core layer constituting the inductive head has a gentle slop toward its both side edges to form thin layers there, thereby allowing a coil layer to be constantly formed on the lower core layer via a layer of non-magnetic material and insulating layer, and stabilizing the insulation characteristic between the lower core layer and coil layer.

Another object of the present invention is to provide a combination read/write thin film magnetic head and a method for manufacturing the same, wherein the lower core layer (a shield layer against a layer of magnetoresistive element) composing the inductive head can be formed by a sputtering method or evaporation method, thereby extending the range for selecting soft magnetic materials to be used for the lower core layer to comply with high frequency recording.

In a first aspect, the present invention provides a combination read/write thin film magnetic head in which a lower shield layer made of magnetic materials, a non-magnetic lower gap layer, a layer of a magnetoresistive element and a non-magnetic upper gap layer are laminated from the lower to the upper, wherein the magnetic head has a lower core layer of a soft magnetic material, an upper core layer formed on the lower core layer via a layer of a non-magnetic material and a coil layer imparting magnetic field to both core layers, said lower core layer being formed into an approximately uniform thickness at the portion confronting said upper core layer and gradually decreasing its thickness along the direction toward its both side edges. More preferably, the surface of the both edges of the lower core layer assumes a curved surface to gradually reduce the thickness of the layer.

In a second aspect, the present invention provides a combination read/write thin film magnetic head, wherein the lower core layer and upper core layer are formed with a soft magnetic alloy comprising Fe as a main component, rare earth elements or one or two or more kinds of elements selected from Ti, Zr, Hf, V, Nb, Ta and W, and O; or the lower core layer and upper core layer are formed with a soft magnetic material containing Co as a main component and the one or two or more kinds of elements selected from Fe, Ni, Pd, Mn and Al as major components, further comprising rare earth elements or one or two kinds of elements selected from Ti, Zr, Hf, Nb, Ta, Mo, W or Y, and O. These soft magnetic materials can be applied by a sputtering method or evaporation method.

In a third aspect, the present invention provides a method for manufacturing a combination read/write thin film magnetic head having a lower core layer of a soft magnetic material, an upper core layer formed on the lower core layer via a layer of a non-magnetic material and a coil layer imparting magnetic field to both core layers, said lower core layer being formed by the following steps comprising;

forming a buffer layer of magnetic materials, forming a resist layer on said buffer layer in a prescribed thickness, forming a plating layer on said buffer layer reaching to the both side edges of said resist layer, eliminating said resist layer forming a lower core layer by sputtering or evaporating soft magnetic materials on-the portion of the buffer layer where said resist layer has been eliminated, and eliminating said plating layer.

In a fourth aspect, the present invention provides a method for manufacturing a combination read/write thin film magnetic head having a lower core layer of a soft magnetic material, an upper core layer formed on the lower core layer via a layer of a non-magnetic material and a coil layer imparting magnetic field to both core layers, said lower core layer being formed by the following steps comprising;

forming a buffer layer of non-magnetic materials, forming a resist layer on said buffer layer in a prescribed thickness, forming a plating layer on said buffer layer reaching to said both side edges of said resist layer, eliminating said resist layer eliminating the portion of the buffer layer where said resist layer has been eliminated, forming a lower core layer by sputtering or evaporating soft magnetic materials on the portion where said buffer layer has been eliminated, and eliminating said plating layer.

In the present invention, the configuration of the lower core layer constituting the inductive head is so formed as to allow its thickness to be gradually reduced toward its both side edges, thereby preventing a terrace from being formed at both side edges as seen in the prior art shown in FIG. 5, allowing the coil layer to be constantly formed, making the thickness of the layer of the non-magnetic material on the upper core layer uniform and stabilizing the insulating ability of this layer of the non-magnetic material.

Since the lower core layer can be formed by a sputtering method or evaporation method, the range for selecting soft magnetic materials for forming the lower core layer is extended. For example, it is made possible to apply a soft magnetic material containing Fe or Co as a main component and having a microcrystalline phase and/or amorphous phase with a high saturated magnetic flux density, low coercive force and high resistivity, thus enabling recording by a high frequency magnetic field.

The method for forming the lower core layer comprises forming a buffer layer on the upper gap layer followed by applying a resist on the buffer layer, forming a plating layer on the buffer layer reaching to the surface of both side edges of the resist layer and eliminating the resist layer. A plating layer with an overhang portion remains after the process above. When a buffer layer is applied through the space under the overhang portion above by a sputtering method or evaporation method, the thickness of this layer is gradually reduced toward both side edges, forming a lower core layer having a curved surface at the side edges. Because the width of the layer of the non-magnetic materials formed on the lower core layer can be uniform with no need of applying an ion milling process to the lower core layer, the upper core layer formed between the layer of the magnetoresistive element and lower core layer is prevented from being damaged.

DESCRIPTION OF THE PREFERRED EMBODIMENT

Figure 1:
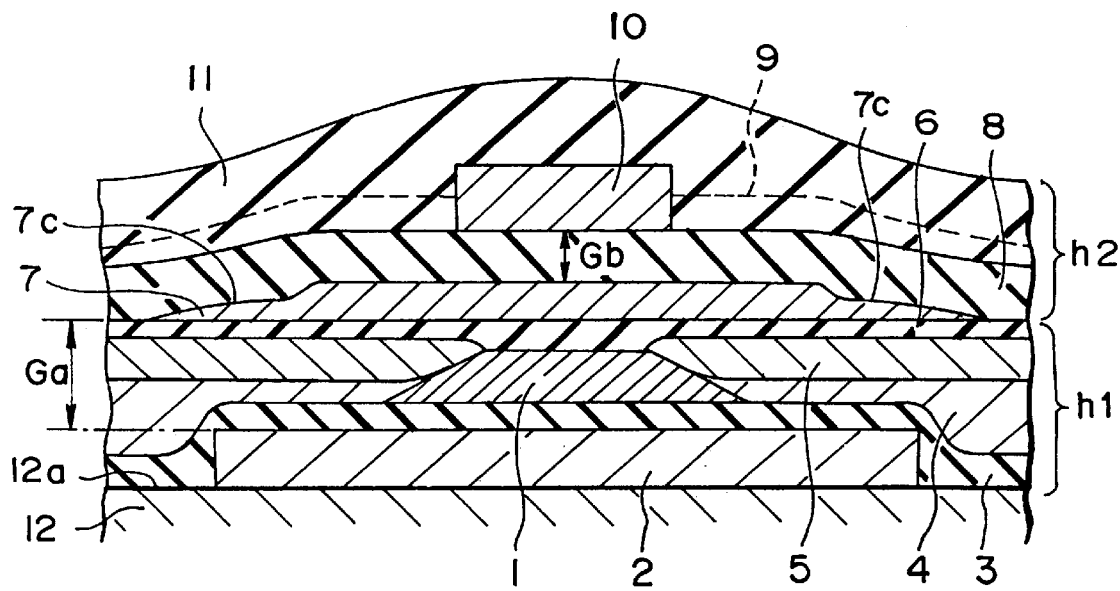
FIG. 1 is an enlarged sectional view showing the constructions of the read-out head and inductive head (recording head) of the combination read/write thin film magnetic head according to this invention.

The present invention will now be described referring to the drawings. The same members with those in hitherto described prior art are quoted by the same reference numerals as in the latter.

Figure 2:
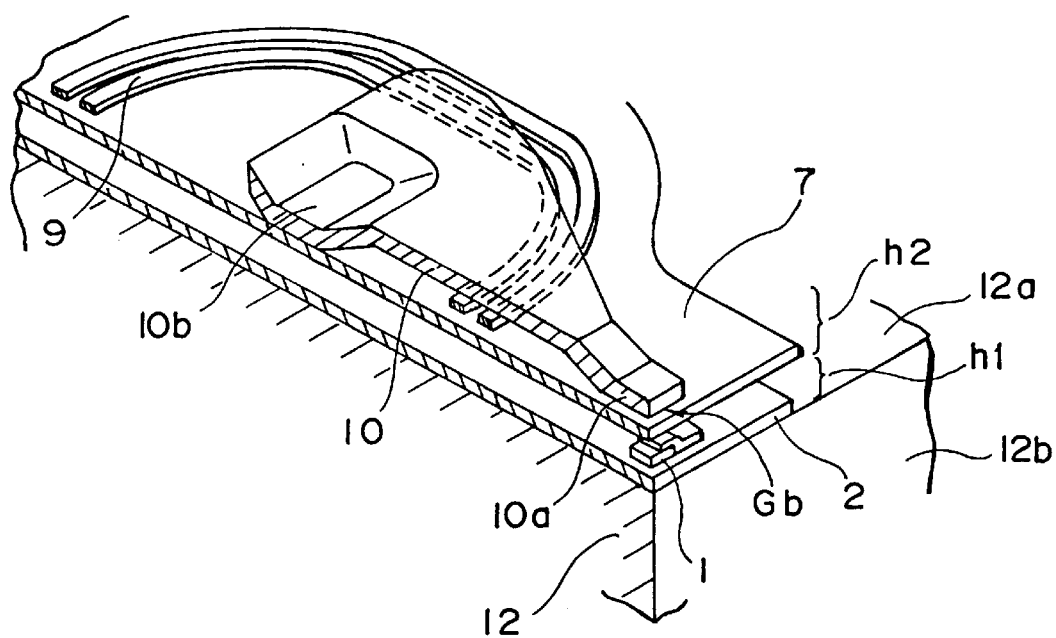
FIG. 2 is a half sectional perspective view showing the configurations of the lower core layer and upper core layer of the thin film magnetic head.

FIG. 1 is an enlarged section viewed along the opposite side of the thin film magnetic head according to this invention. FIG. 2 is a perspective view illustrating the overall construction of the thin film magnetic head according to this invention formed on a slider 12.

The thin film magnetic head shown in FIG. 1 and FIG. 2 is formed on the trailing side face on the slider 12 constructing a floating type magnetic head in which a read-out head h1 and an inductive head h2 for recording is laminated.

The read-out head hi detects fringing magnetic field from a recording medium like a hard disk utilizing its magnetoresistive effect to read magnetic signals. The read-out head h1 is provided with a lower gap layer 3 comprising a non-magnetic material like aluminum oxide ($Al_2O_3$) on the lower shield layer 2 comprising sendust (Fe-Al-Si alloy) or permalloy (Fe-Ni alloy) formed by a sputtering on the trailing side edges 12a of the slider 12. On the lower gap layer 3 is laminated a layer of a magnetoresistive element 1. The layer of a magnetoresistive element 1 has a three layer structure, from the lower to the upper being composed of a SAL layer of a soft magnetic material (Co-Zr-Mo alloy or Ni-Fe-Nb), SHUNT layer of a non-magnetic material (for example tantalum: Ta) and a MR layer having a manetoresistive effect (Fe-Ni alloy).

On both side of the magnetoresistive element 1, a hard bias layer 4 that impart a bias magnetic field to the MR layer and a lead layer 5 (tungsten: W or copper: Cu) that impart a sense current to the MR layer are formed, above which is formed an upper gap layer 6 comprising aluminum oxide.

The inductive head (a recording head) h2 has a lower core layer 7 formed with a soft magnetic material. This lower core layer 7 also serves as a shield layer for the read-out head h1. A layer of a non-magnetic material 8 is formed on the lower core layer 7, on which a coil layer 9 is provided forming a flat spiral pattern via an organic insulating layer. The tip 10a of the upper core layer 10 above confronts the lower core layer 7 on the upper face of ABS 12b with a gap width Gb as shown in FIG. 2, the terminal end 10b of which being magnetically connected to the lower core layer 7. A protective layer 11 is provided on the upper core layer 10.

A recording current is imparted to the coil layer 9 at the inductive head (recording head) h2, inducing a recording magnetic field from the coil layer 9 to the lower core layer 7 and upper core layer 10. Magnetic signals are recorded on a recording medium like a hard disk by fringing magnetic field between the lower core layer 7 and the tip 10a of the upper core layer 10.

The gap width Gb of the inductive head h2 should be as narrow as possible in order to enable a high density recording of the recording signals on a recording medium like a hard disk from the inductive head h2. Since the gap width Ga is determined by the clearance between the lower shield layer 2 and lower core layer (upper shield layer) 7 in the read-out head h1, the distance between the lower gap layer 3 and upper gap layer 6 should be formed as small as possible for attaining a high resolving power for fringing magnetic field from the recording medium recorded in a high density.

Figure 5:
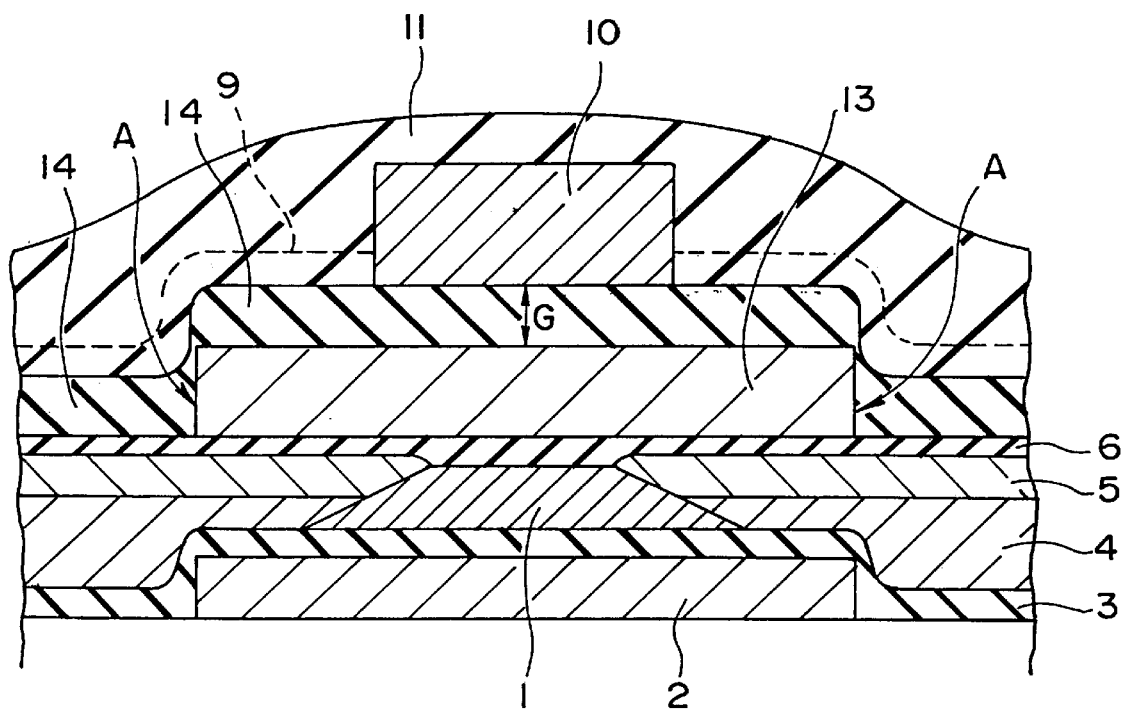
FIG. 5 is an enlarged sectional view showing the constructions of the read-out head and inductive head (recording head) of the conventional thin film magnetic head.

As shown in FIG. 1, the lower core layer 7 is formed in a constant thickness within the area where the lower core layer 7 confronts the upper core layer 10, the thickness of the layer being gradually thin toward the both side edges of the core layer 7. The upper faces 7c's of the both side edges of the lower core layer 7 assumes a curved surface to gradually reduce the thickness of the layer. Therefore, the layer of the non-magnetic material 8 formed on the lower core layer 7 has a gentle slope with an approximately uniform thickness. Even when the area for forming the lower core layer 7 is narrower than the area for forming the coil layer 9 and when the coil layer 9 is situated above the both side edges of the lower core layer 7, the coil layer 9 is never formed on the terrace as shown in FIG. 5, thereby hardly creating any defects in the coil layer 9.

According to this invention, the lower core layer 7 is applicable by a sputtering method as described hereinafter, which makes it possible to extend the selection range for soft magnetic materials for forming the lower core layer 7. According to this invention, a soft magnetic material having a high magnetic permeability at a frequency of hundreds of MHz or more, a high saturated magnetic flux density of 5 kg or more and a low coercive force with a high resistivity can be used.

Any one of the following two kinds of soft magnetic materials can be used for the lower core layer 7 in this invention:

(1) A soft magnetic material represented by the composition formula $Fe_aM_bO_c$ characterized by satisfying the relation of $50 \leq a \leq 70$, $5 \leq b \leq 30$, $10 \leq c \leq 30$ and $a+b+c=100$. The material contains Fe that is responsible for magnetism as a main component. Although the larger content of Fe is preferable for obtaining a high magnetic flux density, resistivity would be small when the content of Fe is 70 atomic % or more. M represents one, or two or more kinds of rare earth elements (Sc, Y belonging to 3A group in the periodic table or lantanoids), or is composed of one, or two or more kinds of elements belonging to 4A, 5A or 6A groups in the periodic table such as Ti, Zr, Hf, V, Nb, Ta or W. M is essential for obtaining soft magnetic characteristic (high saturated magnetic flux density, low coersive force and high resistivity). These elements form oxides by combining with oxygen. Adjusting the content of the oxides makes resistivity high, which prevents eddy current in the lower core layer 7 and suppresses magnetic permeability to decrease at high frequency.

A microcrystalline phase of Fe with a bcc crystal structure and amorphous phase containing a large amount of M and O may be preferably mixed in the material, the proportion of the microcrystalline phase being 50% or less. Although this proportion is expressed in % by volume, it may be by area on the surface or cross section.

(2) A soft magnetic material mainly containing; a crystalline phase, which has a face-centered crystal structure (fcc) or a body-centered crystal structure (bcc) or is a mixture thereof, containing Co as a main component and the elements T selected from one, or two or more of the elements of Fe, Ni, Pd, Mn and Al as another main elements; and a ferromagnetic amorphous phase surrounding these crystalline phase and containing one, or two or more kinds of elements M selected from Ti, Zr, Hf, Nb, Ta, Mo, W, Y and rare earth elements, O, at least one of the oxide of M above, Fe and the elements T.

In more detail, the material is a soft magnetic material represented by the composition formula of $(Co_1.cTc)_xM_yQ_zX_wY_s$, characterized by satisfying the following relation of: $0.05 \leq c \leq 0.5$; y, z, w and a being in atomic %; $3 \leq y \leq 30$, $7 \leq z \leq 40$, $0 \leq w \leq 20$ and $0 \leq s \leq 20$. Co and the elements T's selected from one, or two or more kinds of Co, Ni, Pd, Mn and Al are main components, Co, Fe and Ni being responsible for magneticity. A higher contents of Co and Fe are preferable for obtaining a high saturated magnetic field, making however the saturated magnetic flux density small when the contents of Co and Fe are too little.

M's are composed of one, or two or more of elements selected from Ti, Zr, Hf, Nb, Mo, W and rare earth elements (Sc or Y belonging to 3A group in the periodic table or lantanoids). M's are essential for obtaining soft magnetic characteristic. These elements form oxides by combining with oxygen. It is possible to enhance resistivity by increasing the content of these oxides.

The elements T's (one, or two or more elements selected from Fe, Ni, Pd, Mn and Al) are the elements for stabilizing the face-centered crystal structure (fcc structure) of Co or largely influencing on the uniaxial anisotropic magnetic field. While the elements Y's (one, or two or more of Au, Ag, and the elements belonging to the platinum group (Ru, Rh, Pd, Os, Ir or Pt)) improve corrosion resistance, soft magnetic characteristic will be decreased when their content exceeds 20 atomic t. Q's are composed of one, or two or more of the elements selected from O, N, C and B while X is one, or two or more of the elements selected from Si or Cr.

For the purpose of obtaining more improved soft magnetic characteristic and high saturated magnetic flux density, it is desirable that the range of y and z should be 5 to 20 and 10 to 30 in atomic %, respectively.

The proportion of the microcrystalline phase should be preferably 50% or less in a mixture of a microcrystalline phase comprising microcrystals of Co with a fcc structure as a main component and microcrystals of Fe with a bcc structure as a main component, and an amorphous phase containing a large amount of M's and O. Although this proportion is expressed in % by volume, it may be in % by area on the surface or cross section.

Increasing the recording frequency is made possible by forming the lower core layer 7 with the soft magnetic material.

When the recording frequency is the same order with that in the prior art, permalloy (Fe-Ni alloy) may be used as a material for forming the lower core layer 7 by a sputtering method.

FIG. 3 is an enlarged cross section of the first method for manufacturing the lower core layer 7.

Figure 3A:
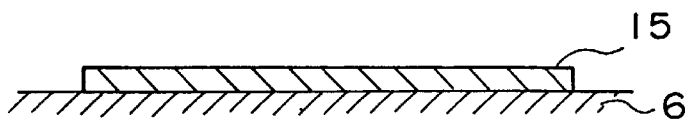
FIG. 3A to G are the enlarged sectional views showing the respective step in the first method for manufacturing the lower core layer.
Figure 3B:
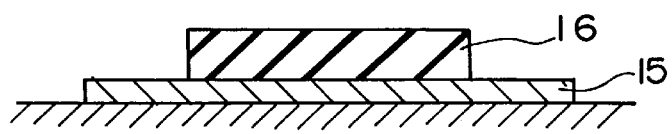
Figure 3C:
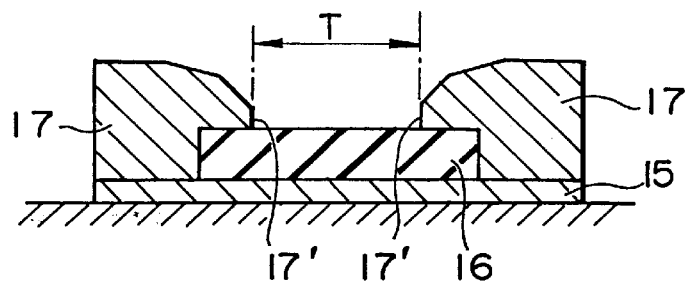
Figure 3D:
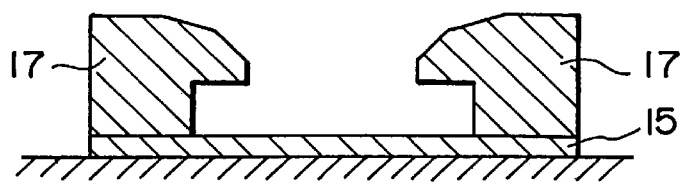

In FIG. 3A, a buffer layer 15 comprising a magnetic material like permalloy (Fe-Ni alloy) is formed on the upper gap layer 6. After applying a resist solution on the buffer layer 15, the layer is developed by exposure to form a resist layer 16 on the buffer layer 15 as shown in FIG. 3B. In FIG. 3C, a plating layer 17 is formed on the buffer layer 15 reaching to the both side edges of the resist layer 16. In this case, the plating layer 17 and the portion of 17 riding on the resist layer 16 forms two overhang portions 17', leaving a prescribed clearance size T between these two overhang portions. The resist layer 16 is then eliminated as shown in FIG. 3D.

Figure 3E:
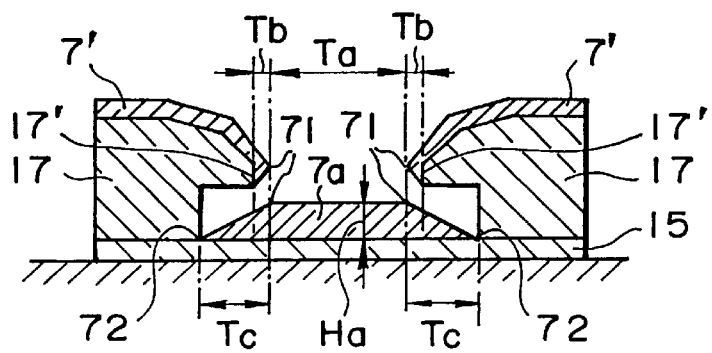

In the next step, the soft magnetic materials in hitherto described (1) or (2) are applied on the buffer layer 15 and plating layer 17, also forming the lower core layer 7a on the buffer layer 15 and a layer of the soft magnetic material 7' on the plating layer 17, as shown in FIG. 3E. The soft magnetic material 7' formed on the plating layer 17 protrudes from the overhang portions 17' by a length of Tb.

Accordingly, at the portion having a length of Ta obtained by subtracting the length Tb from the length T, the lower core layer 7a is formed as a layer having a predetermined thickness of Ha. Moreover, a layer having a curved surface is formed by gradually reducing its thickness starting from 71 on the lower core layer 7a reaching to the side edge 72 as shown in the enlarged drawing in FIG. 1, because there are an overhang portion 17' and a layer of the soft magnetic material 7' at the portion having a length of Tc.

Figure 3F:
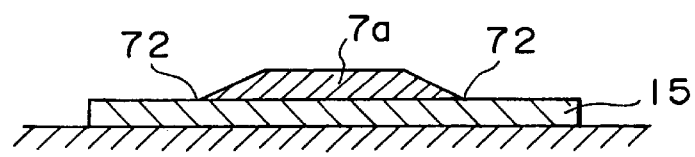
Figure 3G:
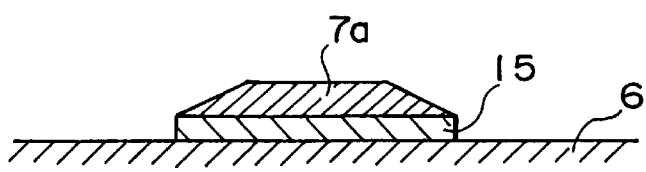

In the next step, the plating layer 17 is excised by an wet-etching as shown in FIG. 3F. Then, the buffer layer 15 outside of the lower core layer 7a is excised from the side edge 72 of the lower core layer 7a, forming a buffer layer 15' only under the lower face of the lower core layer 7a as shown in FIG. 3G. Both of the buffer layer 15 and the upper gap layer 6 have a thickness of about 1000 angstrom. While excising the buffer layer 15 by ion milling, the upper gap layer 6 is not affected by ion milling since the buffer layer 15 and upper gap layer 6 have an nearly identical thickness.

Since the lower core layer 7a can be formed by a sputtering method with no need of excising the above lower core layer 7a itself, there is few possibility for damaging the upper gap layer 6 accompanying a long life of the combination read/write thin film magnetic head.

FIG. 4 shows an enlarged cross section of the second method for manufacturing the lower core layer 7.

Figure 4A:
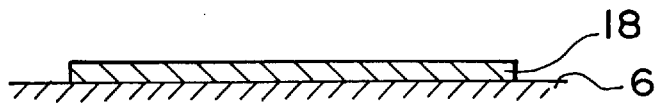
FIG. 4A to H are the enlarged sectional views showing the respective step in the second method for manufacturing the lower core layer.
Figure 4B:
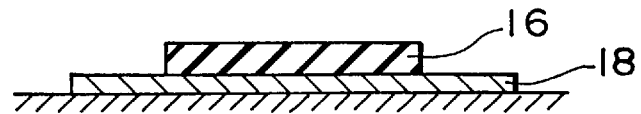
Figure 4C:
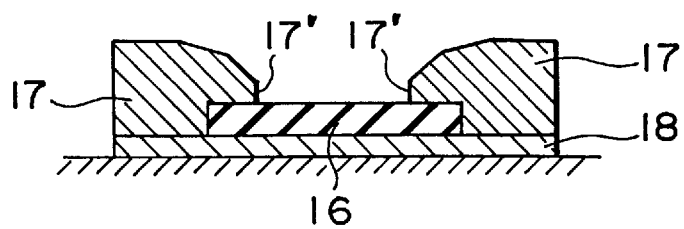
Figure 4D:
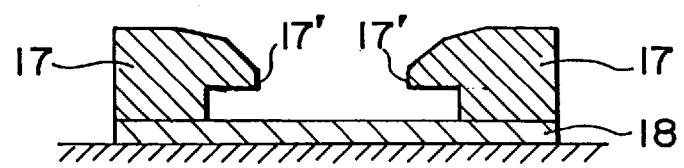
Figure 4E:
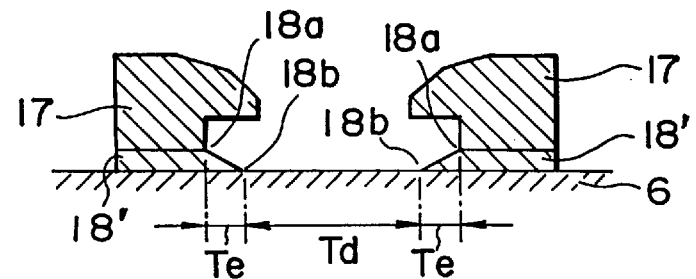

In FIG. 4A, a plating layer comprising Au or Cu is formed on the upper gap layer 6 as a lower buffer layer 18. In FIG. 4B, a resist layer 16 is formed on the lower buffer layer 18 while, in FIG. 4C, a plating layer 17 is formed from the lower buffer layer 18 to the surface of both side edges of the resist layer 16, forming two overhang portions 17'. Then the resist layer 16 is excised as shown in FIG. 4D, In the next step shown in FIG. 4E, the lower buffer layer 18 is excised in a length of Td, exposing an upper gap layer 6 within the length Td. Since the lower buffer layer 18' within a length of Te is hardly subjected to ion milling because it is covered with an overhang portion 17' of the plating layer 17, the layer is formed by gradually reducing its thickness from 18b to 18a as shown in the figure. Therefore, the lower buffer layer 18 and upper gap layer 6 is formed in an approximately same thickness. This results in a low possibility for damaging the upper gap layer 6 during excising the buffer layer 18 by ion milling.

Figure 4F:
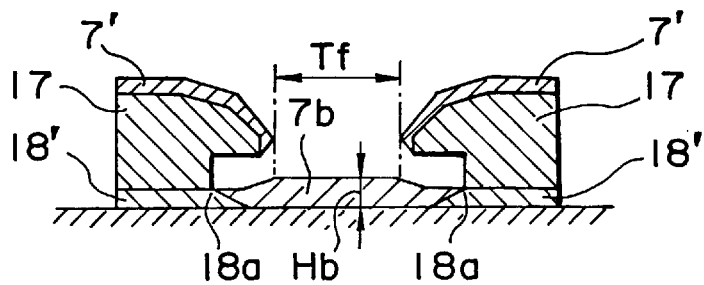
Figure 4G:
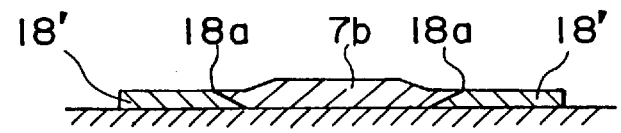
Figure 4H:
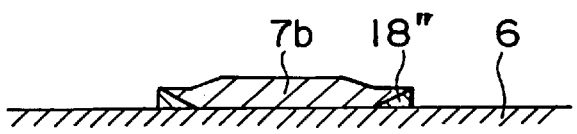

Finally, the soft magnetic material hitherto described in (1) or (2) is applied on the surface within Td and Te, and on the plating layer 17 by a sputtering method, forming a lower core layers 7b within Td and Te and a layer of soft magnetic material 7' on the plating layer 17 as shown in FIG. 4F. While the thickness of the lower core layers 7b is kept a constant value of Hf within the length of Tf, it is gradually reduced toward its side edge 18a, forming a curved surface. Then, the resist layer 17 is excised as shown in FIG. 4G and the buffer layer 18' is excised from the side edge 18a of the lower core layers 7b by ion milling as shown in FIG. 4H, leaving a very small amount of buffer layer 18" on the upper gap layer 6.

In the step shown in FIG. 3 and FIG. 4, the lower core layers having the same configuration are formed. In the step shown in FIG. 3G, however, both of the lower core layer 7a and buffer layer 15' function as upper shield layers above the layer of the magnetoresistive element 1 because a buffer layer 15' composed of a magnetic material has not been formed beneath the lower core layer 7a. In FIG. 4, the buffer layer 18 serves as a part of the upper gap layer 6 when the buffer layer 18 remains under the lower core layers 7b because the buffer layer 18 is composed of a non-magnetic material, the buffer layer 18 substantially being elongating the gap width at the read out portion h1. Therefore, the buffer layer 18 situated under the lower core layers 7b has been excised.

The lower core layer 10 shown in FIG. 1 has a rectangular cross section. This lower core layer 10 may be formed either by a sputtering method or by a plating method.

It is also possible to form the lower core layers shown in FIG. 3 and FIG. 4 by evaporating the soft magnetic material.

According to this invention, there are no terrace at both side edges of the lower core layer, which makes it possible to constantly form a coil layer besides preventing pin holes from appearing since the fluctuation of the thickness of the layer of non-magnetic materials on the lower core layer is small.

Forming the upper core layer by a sputtering method enables to expand the selection range of soft magnetic materials to be used for the lower core layer, enabling also to use a soft magnetic material having a high magnetic flux density, low coersive force and high resistivity, thereby making it possible to increase the recording frequency.

What is claimed is:

1. A method for manufacturing a combination read/write thin film magnetic head having a readout head and a recording head, the readout head having a lower shield layer made of magnetic material, a non-magnetic lower gap layer formed on the lower shield layer, a layer of a magnetoresistive element formed on the lower gap layer and non-magnetic upper gap layer formed on the magnetoresistive element, an upper shield layer formed on the upper gap layer, said recording head having a lower core layer of a soft magnetic material serving also as the upper shield layer, an upper core layer formed on the lower core layer via a layer of a non-magnetic material and a coil layer imparting magnetic field to both core layers, said lower core layer being formed by the following steps comprising:

forming a buffer layer of magnetic materials;

forming a resist layer on said buffer layer of substantially uniform thickness;

forming a plating layer on said buffer layer reaching to both side edges of said resist layer;

eliminating said resist layer;

forming a lower core layer by sputtering or evaporating soft magnetic materials on the portion of the buffer layer where said resist layer has been eliminated; and eliminating said plating layer.

2. A method for manufacturing a combination read/write thin film magnetic head having a readout head and a recording head, the readout head having a lower shield layer made of magnetic material, a non-magnetic lower gap layer formed on the lower shield layer, a layer of a magnetoresistive element formed on the lower gap layer and non-magnetic upper gap layer formed on the magnetoresistive element, an upper shield layer formed on the upper gap layer, said recording head having a lower core layer of a soft magnetic material serving also as the upper shield layer, an upper core layer formed on the lower core layer via a layer of a non-magnetic material and a coil layer imparting magnetic field to both core layers, said lower core layer being formed by the following steps comprising;

forming a buffer layer of non-magnetic materials;

forming a resist layer on said buffer layer of substantially uniform thickness;

forming a plating layer on said buffer layer reaching to both side edges of said resist layer;

eliminating said resist layer;

eliminating the portion of the buffer where said resist layer has been eliminated;

forming a lower core layer by sputtering or evaporating soft magnetic materials on the portion where said buffer layer has been eliminated; and eliminating said plating layer.

* * * * *